Feb. 20, 1973    H. M. WILSON    3,717,566
CORROSION RATEMETER
Filed Nov. 11, 1971
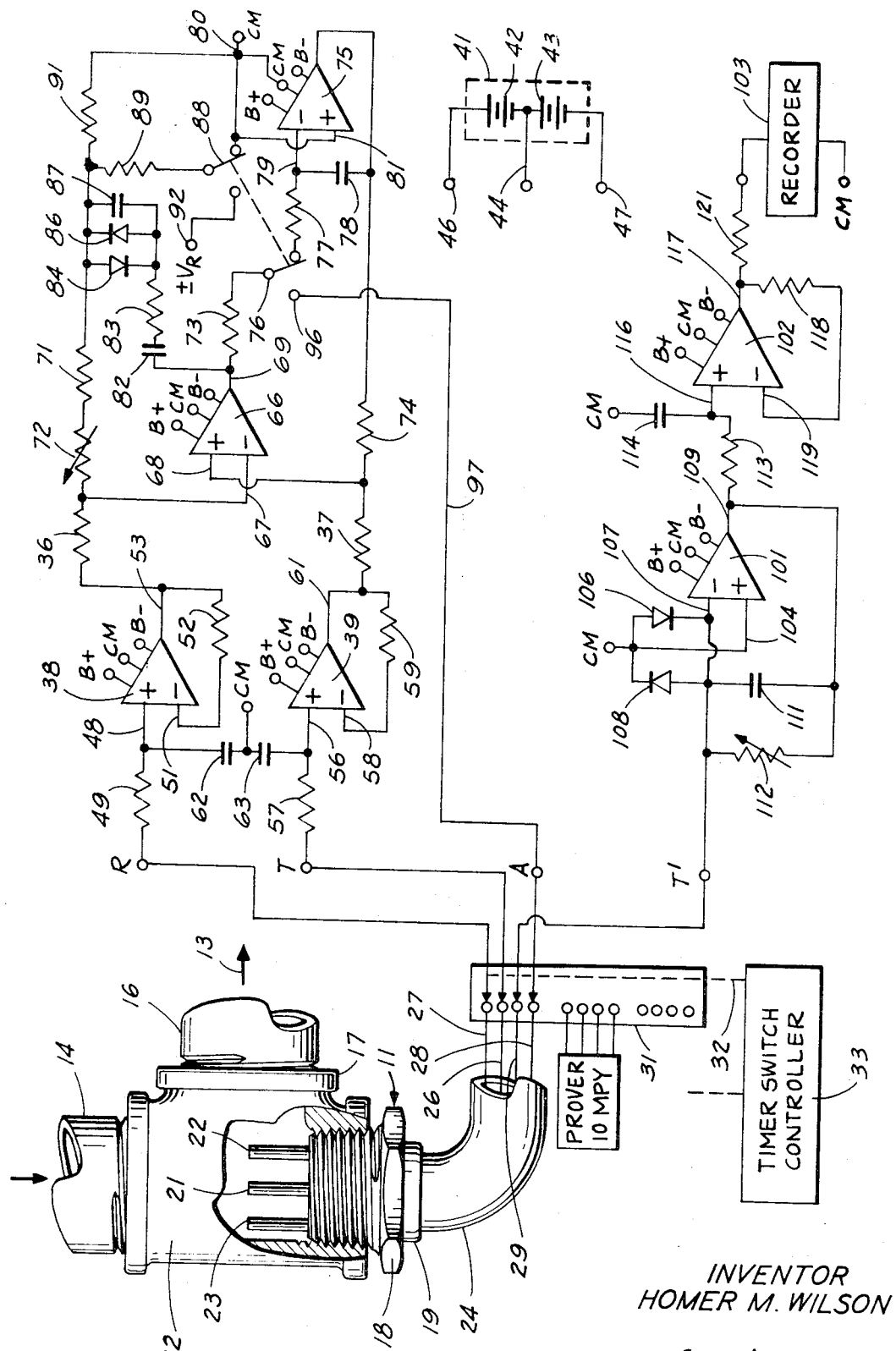
INVENTOR
HOMER M. WILSON
BY Emil J. Bednar
ATTORNEY United States Patent Office 3,717,566
Patented Feb. 20, 1973

3,717,566
CORROSION RATEMETER
Homer M. Wilson, Houston, Tex., assignor to Petrolite
Corporation, St. Louis, Mo.
Filed Nov. 11, 1971, Ser. No. 197,871
Int. Cl. G01n 27/26
U.S. Cl. 204—195 C
10 Claims

ABSTRACT OF THE DISCLOSURE

A corrosion ratemeter with test specimen, reference and third electrodes contactable by a corrodant. A voltage loop circuit connects the reference and test eletrodes in first and second arms of a balanced bridge to the inputs of a differential input amplifier and circuit common. The amplifier output connects to a signal correction means in "null" operation. Third and fourth bridge arms connect the inputs of the amplifier to circuit common of the D.C. source and one arm includes the signal correction means. A reference signal in one bridge arm controls the amplifier to pass current between the test and third electrodes for producing a polarization potential (e.g. 10 mv.) between the test and reference electrodes. Readout means monitor the polarization current which is indicative of the corrosion rate occurring at the test electrode. The signal correction means balances the bridge during "null and measurement" operations relative to the freely corroding potential present at the test and reference electrodes whereby the ratemeter exhibits very high input impedance and high common mode rejection characteristics against extraneous electrical noise.

BACKGROUND OF THE INVENTION

(1) Field of the invention

This invention relates to measuring and testing corrosion processes and it relates particularly to the instruments and electrochemical techniques used in the study of corrosion processes.

(2) Description of the prior art

It is often desirable to determine the rates at which metals corrode within a corrodant such as a corrosive liquid. For example, corrosion inhibitors are added to aqueous liquids to reduce the corrosion of exposed metals. Instruments are used to measure the rate at which these metals corrode so that the effectiveness of the inhibitor can be determined. The measure of the rate of corrosion upon metals usually involves an instrument associated with a probe carrying electrodes immersed within the corrodant. These instruments are usually termed "corrosion ratemeters." The electrodes in the corrodant undergo certain electro-chemical changes that are related to the corrosion of the specimen forming the test electrode. The rate of corrosion can be correlated with the electro-chemical effects upon the test (specimen) electrode contacted by the corrodant.

The corrosion of metallic materials by a corrodant causes the dissipation of electrical energy by electrochemical action. For example, two metallic electrodes immersed in a corrodant develop a potential difference as a result of half-cell effects. The potential at a freely corroding test electrode (no external current application) in a dynamic system where the corrosion products are either diffusing or dissolving, eventually reaches a relatively steady-state potential differential realtive to a reference electrode. This potential difference may be termed the "freely corroding potential" of the test electrode forming the half-cell subjected to the corrodant. A test electrode, which is subject to corrosion, may be polarized into a non-corroding state by passing direct current from an external source between the electrode and corrodant. The amount of current-induced change in the electrical potential of the test electrode, with respect to a reference electrode, is termed as "polarizing potential." The polarizing potential may be anodic or cathodic, depending upon the directional flow of current which produces the polarization potential. Correlation of the polarization potential increments against the applied current increments may be used to determine the rate of corrosion of the test electrode subject to corrosion action.

An electro-chemical process and apparatus, especially useful in measuring corrosion rates, is described in U.S. Pat. 3,406,101. In this patent, there is described a corrosion ratemeter which includes a probe having three electrodes adapted to be exposed to a corrodant such as a corrosive liquid, an adjustable current source, an ammeter and a high impedance voltmeter as primary components. The adjustable current source applies a small electric current between a "test" electrode and an "auxiliary" or third electrode. At the same time, the voltmeter monitors the polarization potential produced by current flow between the test electrode and a reference electrode. The current flow slightly polarizes the surface of the test electrode, and as a result, causes a shift in potential (polarization potential) between the test and reference electrodes. The current flow required to produce a certain desired polarization potential (usually about 10 millivolts) is directly proportional to the corrosion rate of the test electrode undergoing corrosion. Usually, the polarization is selected within the linear voltage corrosion rate environmental conditions, and good results have been obtained with between 5 and 20 millivolts, but preferably 10 millivolts, polarization.

If the corrosion rate is low, a very small curent flow will polarize the test electrode. If the corrosion rate is high, more current flow is required to polarize the test electrode. The weight of metal lost from the test electrode (by electro-chemical corrosion) is directly proportional to the current flow in accordance with Faraday's Law. Thus, by use of appropriate constants and adjustments of the surface area of the test electrode, the ammeter can be calibrated directly into any desired units of corrosion rate providing the surface area of the test electrode exposed to corrosion can be adjusted to the desired range. In order to provide symmetry of the probe, and for other reasons, the exposed surface area of all electrodes is usually made identical. Thus, if the electrodes are constructed identically of the same material, such as 10–20 mild steel, any of the electrodes may serve as the auxiliary, test and reference functions in the electro-chemical techniques for determining the rate of corrosion.

In corrosion ratemeters of the type described in the mentioned patent, the amount of current which flows between the test and third electrodes to produce a certain polarization potential is measured to determine the rate of corrosion occurring at the test electrode. Any potential differences, such as the freely corroding potential, present between the test and reference electrodes, other than the polarizing potential, produce erroneous results in corrosion rate determinations. Obviously, these instruments can produce highly accurate results when a correction is made for the non-polarizing potential differences between these electrodes, principally the freely corroding potential, which may exist between these electrodes before, and also during, application of the polarizing current. Additionally, in these instruments correction for the freely corroding and other potentials must be made without effecting the impedance between the reference and test electrodes immersed within the corrodant. Otherwise, a constant polarizing current will produce corresponding variations in polarization potential to be developed between these electrodes.

Corrosion ratemeters employing controlled current flow for producing a certain polarization potential between electrodes, may employ a manual adjustment to remove the freely corroding potential component from the total potential difference between the test and reference electrodes. As a result, only the polarization potential will be the measure when the controlled current is at the exact magnitude to provide a correct measurement of corrosion rate occurring at the test electrode. However, rather significant changes in the magnitude of the freely corroding potential, and also the impedance between the reference and test specimen electrodes, can occur over a short time interval during such manual adjustment. Then, the ultimate accuracy of the measurement of corrosion rate with these instruments can not be obtained in rapidly changing environments. Additionally, manual adjustments must be made for each set of electrodes with which the instrument is employed, and at closely spaced time intervals so that most accurate results in measurement of corrosion can be obtained.

The required correction for the freely corroding potential in the controlled current type of corrosion ratemeters becomes a serious obstacle when switching devices are employed so that a single corrosion ratemeter monitors a plurality of widely spaced apart probes, each probe carrying test, reference and third electrodes. For example, consider the problem in monitoring the corrosion occurring at 10 probes in various aqueous streams in a refinery or chemical plant at a distance of a mile from the corrosion ratemeter. Each probe is connected sequentially to the corrosion ratemeter. However, each monitored probe requires a correction in the corrosion ratemeter to compensate for the freely corroding potential at the test electrode. Then, the desired accurate measurement is made by adjusting current flow until a certain polarization occurs at the electrodes. Performing cathodic and anodic measurement of corrosion rate at each probe immediately doubles the number of operational steps required with the manually adjusted instrument. Therefore, an automatic system is desired to perform the necessary correction for the freely corroding potential.

The corrosion ratemeter can employ suitable circuitry to provide automatically an equal but opposing potential for removing the freely corroding potential from the circuit including the test and reference electrodes. The freely corroding potential is usually less than 100 millivolts and frequently is about the same magnitude as the certain polarization potential (generally 10 millivolts) to be established by controlled current between these electrodes. Thus, the input potential correcting circuitry is required to sense and then automatically remove a potential of a very small magnitude from substantially the same magnitude of the certain polarization potential to be established between these electrodes. The resistance of the conductors interconnecting each probe with the corrosion ratemeter becomes significant at distances of 1000 feet or more. Resistance in these conductors produces an IR potential in the conductor connected to the test electrode that is summed with the freely corroding potential at the elecrodes and should be removed by the same correction circuitry. However, this resistance-induced potential is a function of the polarizing current passing through the conductor to the test electrode. As a result, the resistance-induced potential varies with current magnitude. Therefore, non-correctable errors can be introduced into the measurement of corrosion rate if high current magnitudes are conducted on the same conductors as the freely corroding potential.

An automatic correcting type of corrosion ratemeter using the controlled current mode of operation is of great advantage. Circuitry is required during "null" operation to compensate for the freely corroding potential which exist as the potential difference between the reference and test electrodes in a freely corroding state when no external current flows between the electrodes. During the "measurement" operation of such corrosion ratemeter, the circuitry must provide a reference signal which produces a current flow between the third and test electrodes. This current must be of such a magnitude that a certain polarization potential (5–25 mv.) is produced between the test and reference electrodes in addition to the freely corroding potential. Additionally, a readout means must measure the output current creating this polarization potential which current magnitude is representative of the corrosion rate occurring at the test electrode.

Various circuits may be envisioned for an automatic correcting type of corrosion ratemeter which can perform the above functions in the proper sequence and with the necessary accuracy of measurement. In one such circuit, the reference signal was introduced directly to the input of the amplifier connected to the reference and test electrodes and resulted in a great change in input impedance or resistance. As a result, the output signal from this amplifier did not maintain a predetermined relationship to the certain polarization potential in "measurement" operation. Obviously, any resistance variations in the input circuit to the amplifier will cause the amplifier to receive an error signal in the input circuit besides the desired components representing the freely corroding potential and certain polarization potential. However, circuitry where the reference signal is applied to the input of the amplifier connected to the electrodes is of considerable advantage providing the undesired impedance changes within the input circuit could be overcome.

Extraneous electrical noises which are impressed upon the reference and test electrodes, in some applications, cause an automatic correcting type of corrosion ratemeter to have difficulty in segregating the freely corroding potential and the certain polarization potential from the electrical noise during normal circuit functioning. Thus, extraneous electrical noise can effect the ultimate accuracy of measurement. High-gain circuitry, connected to the reference and test electrodes has difficulty discriminating the millivolt signals against certain types of extraneous electrical noise. In addition, great errors from electrical noise arise in arrangement of circuit common to ground connections between the circuitry of the automatic corrosion ratemeter and the piping and/or auxiliary electrical systems.

The above deficiencies led to the development of the corrosion ratemeter of the present invention. Therefore, it is the purpose of the present invention to provide an automatic corrosion ratemeter which fulfills (1) the need for an automatic "null" and "measurement" operating instrument and (2) applies the reference signal for creating the certain polarization potential, in the input voltage loop circuit of the amplifier connected to the reference and test electrodes, without effecting the ultimate impedance of the input circuit. In particular, the present corrosion ratemeter accurately and automatically corrects for the freely corroding potential, and then applies a reference signal to calibrate the input circuit of a current amplifier for the certain polarization potential which is desired to be established between the reference and test electrodes during corrosion rate determinations.

In addition, the present corrosion ratemeter has a very high impedance voltage loop connected to the reference and test electrodes, and the voltage loop is "floating" relative to any grounds provided by auxiliary electrical circuitry or piping systems. The circuitry of the ratemeter is referenced only to a common circuit connection to the power supply which provides for its functioning.

SUMMARY OF THE INVENTION

In accordance with this invention, there is provided a corrosion ratemeter for determining the rate of corrosion by means of polarization measurements in a corrodant. The meter employs reference, test specimen, and third electrodes in contact with the corrodant. A voltage loop circuit connects the reference and test specimen electrodes and a current loop circuit connects the test specimen and third electrodes. A source of direct current including a differential input amplifier has positive and negative inputs connected to opposite corners of a four arm bridge and receives power from a direct current supply means. An output circuit connects the output of the differential amplifier in "null" operation to a signal correction means and in "measurement" operation to a signal correction means in a current loop circuit to the test specimen and third electrode. The bridge is impedance balanced and has first and second arms, in the voltage loop circuit, connected at their junction to the circuit common of the current supply means. Also, third and fourth arms of the bridge connect at their junction to the circuit common. The inputs of the differential input amplifier are connected to the junctions between the first and second arms, and the third and fourth arms, of the bridge. A signal correction means in "null" operation integrates and stores a corrective signal having a predetermined ratio to the freely corroding potential of the reference and test specimen electrodes. The corrective signal is applied to the voltage loop circuit to remove from the inputs of the differential amplifier a signal component representing the freely corroding potential between the reference and test specimen electrodes. A source means applies a reference signal to one arm of the bridge to produce a component in the output of the differential amplifier during "measurement" operation representative of a certain polarization potential to be established between the reference and test specimen electrodes. The reference signal produces in the current loop circuit in "measurement" operation an output current to the test specimen and third electrodes to create the certain polarization potential between the reference and test specimen electrodes. Readout means measure the output current in the current loop circuit which creates the polarization potential between the refernce and test specimen electrodes.

BRIEF DESCRIPTION OF THE DRAWING

The figure in the drawing includes a prospective view of an illustrative piping system with a corrosion ratemeter probe carrying a plurality of metallic electrodes interconnected by a cable to a switching assembly on which a "Meter Prover" is also connected; and the switching assembly is interconnected to one embodiment of a corrosion ratemeter of this invention which is shown in a schematic diagram.

DESCRIPTION OF SPECIFIC EMBODIMENTS

Referring now to the drawing, there is illustrated a probe 11 contained in a piping system 12 which conveys a corrodant, such as an aqueous fluid, in the direction indicated by the arrow 13. The piping system 12 includes a pair of pipes 14 and 16 interconnected by a T 17 to which the probe 11 is threadedly connected. The probe 11 may be constructed of any suitable form, such as the structure illustrated in U.S. 3,558,462. As illustrated, the probe 11 has a metallic body formed of pipe plug 18 carrying metal electrodes 21, 22, and 23 electrically isolated from the body. The electrodes are connected by conductors (not shown) within the plug 18 to an electrical connector 19. A cable 24 connects at one end to the connector 19 of the probe 11 to provide distance-spanning electrical interconnection to circuitry of the corrosion ratemeter shown in the right-hand portion of the drawing. More particularly, the cable 24 contains electrical conductors 26, 27, 28 and 29 interconnected to position 1 of a multiposition terminal strip in switching assembly 31. The electrodes 21, 22 and 23 are connected to conductors 26, 27 and 28, respectively. In addition, the conductor 29 also connects to the electrode 21 to provide a separate current path to the circuit terminal T' of the circuitry of the corrosion ratemeter.

Preferably, the electrodes 21, 22 and 23 are structurally identical for purposes of the present electro-chemical technique. For purposes of the present description, the electrodes 21, 22 and 23 provide "test," "reference," and "auxiliary" or "third electrode" functions, respectively. The electrode 21 for the precise determination of corrosion rate of a certain steel, should be made of this certain steel. Although the electrodes will usually be metallic, they can be formed of any substance capable of placing ions into solution in a corrodant. It will be apparent that the probe 11 may carry any number of electrodes which by proper switching and electrical connections provide the necessary functions for carrying out the measurement of corrosion rate.

Switching assembly 31 may be of any suitable form. Preferably, it is a multi-pole, multi-position switch actuated by a stepping relay, or other actuator, indicated by dashed line 32. The probe is electrically interconnected in the switching assembly 31 to one set of terminals at position 1. Moveable contacts interconnect selectively the several terminal positions to external circuit terminals designated "R," "T," "T'" and "A." Other probes may be connected to one or more of the remaining terminal positions 2, 3 or 4 on the switching assembly 31. A standardizing device, commonly called a "Meter Prover" is shown connected in terminal position 2 of the switching assembly 31. The Meter Prover is a resistance network representing the electrical function of the probe 11 when corrosion occurs at the test (mild steel) electrode 21 at 10 mils per year (MPY). Switching assembly 31 can be actuated by any suitable device but preferably is integrated into the other switching functions of the corrosion ratemeter by a timer-switch controller 33. The controller 33 may be of any suitable form such as a clock or timer driven rotary switch adapted to produce simultaneously, or in succession, a plurality of switch actuating functions, such as closing or opening relays, or mechanically opening or closing switch contacts in the circuitry shown in the drawing for sequence probe scanning and automatic null and measurement operations of the circuitry. It will be apparent that the switching functions provided by the controller 33 may be arranged readily in any desired sequence and sequence duration by one skilled in the art.

Referring now specifically to the circuitry connected to the switching assembly 31, the corrosion ratemeter of the present invention includes electrodes 21, 22 and 23 on probe 11 interconnected through the conductors 26 through 29. The conductors 26 through 29 interconnect through the switching assembly 31 to terminals R, T, A and the T' current return of the test electrode 21 of the circuitry. The circuitry includes an input circuit formed of a high impedance voltage loop between the test electrode 21 and the reference electrode 22. The voltage loop circuit includes first and second arms of substantially identical electrical characteristics in a balanced impedance electrical bridge. The first and second arms of the bridge can include resistors 36 and 37 which are connected in series to the terminals R and T. Preferably, the first and second arms of the bridge include voltage follower amplifiers 38 and 39 which are connected in series with the resistors 36 and 37. The voltage follower amplifiers 38 and 39 provide very high impedance isolation in the voltage loop circuit relative to the test and reference electrodes. Preferably, the voltage follower amplifiers 38 and 39 are arranged to provide a unity voltage gain. As a result, the amplifiers provide an excellent isolation of the electrodes 21 and 22 from any loading influence exerted by the remainder of the circuitry of the present corrosion ratemeter.

The amplifier 38 connects to a source of direct current 41 which may be a suitable power source indicated by batteries 42 and 43 connected together to form a circuit common "CM" at terminal 44, and B+ and B— terminals 46 and 47, respectively. The amplifier 38 is connected to the source 41 at like designated terminals. The amplifier 38 has a positive input 48 connected through a current limiting resistor 49 to the terminal R, and a negative terminal 51 connected through a feedback resistor 52 to its output 53. The output connects in the first bridge arm in series with the resistor 36. The usual trim and balancing resistor network may be provided by the amplifier 38 but are omitted to simplify the present description. In a like manner, the amplifier 39 has a positive input 56 which is connected through a current limiting resistor 57 to the terminal T of the circuitry. The negative input 58 of the amplifier 39 connects through a feedback resistor 59 to its output 61 which connects in series with the resistor 37 in the second arm of the bridge.

The amplifiers 38 and 39 introduce very high impedance into the voltage loop circuit which connects to the reference and test electrodes, and provide appreciable voltage gain for amplifying small voltage signals. The amplifiers are referenced signal-wise to the circuit common CM. Additionally, the positive inputs 48 and 56 of the amplifiers 38 and 39, respectively, are shunted by capacitors 62 and 63 to circuit common CM. Thus, the voltage loop circuit at the junction of the first and second arms to the test and reference electrodes is connected to circuit common CM to all non-D.C. potentials by capacitors 62 and 63. As a result, the amplifiers 38 and 39 are considered to be "floating" relative to any non-D.C. potentials in the piping system 12, or extraneous electrical noises generated along the cable 24. Stated in another manner, extraneous electrical signals are removed from the voltage loop circuit by the connections of the first and second arms to circuit common CM by capacitors 62 and 63. Thus, the amplifiers 38 and 39 do not receive any electrical signals other than the freely corroding potential and the certain induced polarization potential from the test and reference electrodes.

The voltage loop circuit is completed with the resistors 36 and 37 being connected to the inputs of a differential input amplifier 66. The negative input 67 of the amplifier 66 is connected to the resistor 36 whereas the positive input 68 is connected to the resistor 37. These connections are made at the junction of the first and second arms to the third and fourth arms of the balance impedance bridge forming part of the circuitry of the present corrosion ratemeter. The third and fourth arms have substantially identical electrical characteristics. More particularly, the resistor 36 connects to resistor 71 in the third arm of the bridge which terminates at the circuit common CM connection at terminal 80 to the power source 41. A trimming resistor 72 may be provided in the third arm for an initial manual balancing of the circuitry. The resistor 37 connects to a resistor 74 in the fourth arm of the bridge which also terminates at the circuit common CM connection at the terminal 80 through a means to maintain the balance of the bridge relative to circuit common during both the null and measurement operations. In the present embodiment, this balancing means is provided by an inverting amplifier 75. The amplifier 75 also provides a means for correcting input potential signals in the voltage loop circuit for the freely corroding potential existing between the reference and test electrodes during null and measurement operations of the circuitry.

The amplifier 66 has its output 69 connected through an output current limiting resistor 73 to a single-pole, double-throw switch 76. The right hand position of the switch 76, as illustrated in the drawing, represents "null" operation of the circuitry. The switch 76 connects the output 69 through a signal generating resistor 77 to a capacitor 78 that is in the fourth arm of the bridge. Also, the resistor 77 connects to the negative input 79 of the amplifier 75.

The amplifier 66 includes a feedback circuit connected to the negative input 67 which limits high-frequency excursions of current signals in its output 69. The feedback circuit connects through the resistor 71 to the negative input 67, and may include series connected capacitor 82 and resistor 83, and parallel back-to-back connected diodes 84 and 86 which are shunted by a capacitor 87. The diodes provide a clipping function of high amplitude voltage peaks, frequency control is provided by capacitors 82 and 83 and voltage limiting is provided by the resistor 83. The amplifier 66 is connected at the designated terminals to power source 41. The usual trim and balancing resistor network for the amplifier 66 may be provided but is omitted to simplify the present description. The amplifier 66 may be of any type but usually will be a high gain voltage or current amplifier, or a power amplifier. Generally the amplifier 66 will have a circuit gain of above about 20,000 for satisfactory operation in the present corrosion ratemeter. The switch 76 in the left hand or measurement operation of the circuitry connects the output 69 of the amplifier 66 to terminal 96 which forms a current loop circuit through conductor 97 to the terminal A of the circuitry. Then, the current loop circuit provides current flow between the auxiliary or third electrode 23 and test electrode 21.

The amplifier 75 has its circuit common terminal CM connected to the circuit common CM terminal 80 at the junction of the third and fourth arms of the bridge which arms include the resistors 71 and 74. In addition, the amplifier 75 is connected at the B+ and B— terminals to the power source 41. The amplifier 75 has a positive input 81 connected to circuit common CM terminal 80 and also to a double-pole, single-throw switch 88. The switch 88 is connected through a resistor 89 to the resistor 71. A resistor 91 shunts the resistor 89 to the circuit common CM terminal 80. The switch 88 is shown set for the "null" operation of the circuitry. The resistors 89 and 91 in the left-hand position of the switch 88 in measurement operation connect to a source of reference voltage $\pm V_r$ at the terminal 92. The resistors 89 and 91 are adjusted in value relative to the characteristics of the amplifier 75 so that when the switch 88 connects them to the source of reference voltage $\pm V_r$ or the positive input 81 of the amplifier 75, there is no change in impedance of the amplifier 75 within the fourth arm of the bridge relative to the circuit common CM connection during either null or measurement operation of the circuitry.

The amplifier 75 may be a differential input operational amplifier having a component gain above about 50,00. Generally, the amplifier 75 may be of the same type as the amplifiers 38 and 39 but is connected in an inverting function. As with the other amplifiers, the usual trim and balancing resistor network is omitted to simplify the present description.

The current loop circuit from the test electrode 21 is completed to circuit common CM by the conductor 29. The conductor 29 connects at the terminal T' of the circuitry to the current readout means which provides a non-interferring connection to circuit common CM. The read-out means measure the output current in the current loop circuit from the amplifier 66 which creates the polarization potential between the reference and test specimen electrodes. This measurement is made without any IR induced potential signals being generated in the voltage loop circuit. The terminal T' connects at negative input 104 to an inverting, current-to-voltage converting amplifier 101. The output signal from the amplifier 101 is applied to a voltage follower amplifier 102 for driving a suitable read-out device such as the recorder 103. The amplifier 101 is connected with a positive input 104 to circuit common CM. Parallel, back-to-back connected, shunting diodes 106 and 108 connect negative input 104 to circuit common CM to limit input voltages to amplifier 101.

The amplifier 101 has an output 109 connected through a feedback capacitor 111, and shunting variable resistance 112, to the terminal T'. The variable resistance 112 is adjusted for the desired readout range for the recorder 103 relative to the corrosion rate measurement being effected by the circuitry. For example, the resistance 112 adjustment provides a full-scale recorder 103 output representing 10 MPY (mils per year). The output 109 connects through a signal generating resistor 113 through a series capacitance 114 to circuit common CM and also to the positive input 116 of the amplifier 102. The output 117 of the amplifier 102 connects by a resistor 118 in a feedback circuit to the negative input 119. A current limiting resistor 121 connects the output 117 to one input of the recorder 103. The second input of the recorder 103 connects to circuit common CM. With this arrangement, the amplifier 101 provides the current loop circuit return to circuit common CM. Also, the current flow through the corrodant between the auxiliary electrode 23 and the test electrode 21 is monitored by the amplifier 101. The amplifiers 101 and 102 are differential input current and voltage amplifiers, respectively, and connect at the designated terminals to the power source 41. The amplifier 101 should have a circuit gain of above about 20,000 with relatively high input-output signal separation characteristics. The amplifier 102 may be of the same type as amplifier 75.

The components of the described circuitry have the following characteristics. The switches 76 and 88 are set in null operation and the probe 11 disconnected from the terminals R, T, A and T' to remove external potential signals from the voltage loop circuit. The resistor 72 is adjusted for minimum output current variation from the amplifier 66 resulting from a voltage signal common to terminals R and T but without any significant change in the voltage differential between inputs 67 and 68. Now, the four arms of the bridge are balanced for zero input potential signal conditions since the current flows are equal in the first and second arms, and the current flows are equal in the second and third arms. However, the current flows in all arms of the bridge do not have to be identical.

The amplifier 75 is "active" in maintaining the balanced condition of the bridge when potential signals are applied to the inputs of the amplifier 66. Any output voltage from the amplifier 66 is converted into a current signal in resistor 77 and appears at the input 79 of the amplifier 75. Since the input 81 of the amplifier 75 is at circuit common CM, the current signal drives this amplifier until a voltage signal is stored in the capacitor 78. The signal stored in the capacitor 78, by selection of the component values, has a predetermined and constant relationship to the potential applied between the inputs of the amplifier 66. Therefore, the amplifier 75 brings the bridge into a balanced condition whatever potential is applied between the inputs of the amplifier 66 by producing discrete current flow from its output through resistors 37 and 74 until there is zero potential differential at the inputs of the amplifier 66. The initial potential applied to the inputs of the amplifier 66 will be the freely corroding potential at the electrodes 21 and 22 when the probe 11 is connected into the voltage loop circuit. During measurement operation with the switches 76 and 88 in the left-hand position, the capacitor 78 maintains the voltage signal which caused the bridge to be balanced as to the freely corroding potential which was present in the voltage loop circuit.

A reference voltage $\pm V_r$ is applied to the third arm of the bridge and causes a certain current flow in the resistors 36 and 71 of the first and third arms of the bridge. This current flow produces a potential differential across the inputs of the amplifier 66. This potential differential is that voltage corresponding to the certain polarization potential (e.g., 10 mv.) to be created between the reference electrode 22 and test electrode 21. As a result, amplifier 66 produces an output current in the current loop circuit between the test electrode and third electrode 23, which current magnitude produces the precise magnitude of the certain polarization potential. However, the reference voltage-created, potential differential at the inputs of the amplifier 66 is of opposite polarity to the certain polarization potential. Thus, the output current from the amplifier 66 is precisely controlled to again bring a zero potential differential at the inputs to to amplifier 66. Since the amplifier 75 maintains the signal stored in capacitor 78 in measurment operation, the third and fourth arms of the bridge have the same termination impedances to the circuit common CM during null and measurement operations.

The circuitry is calibrated in the following manner with the switches 76 and 88 set into the right-hand position for null operation. The terminals R, T, A and T' are temporarily removed from connection to the probe 11. The resistor 72 is adjusted to produce a minimum output current variation from the amplifier 66 for a given signal common to both R and T terminals. Now, the terminals, R, T, A and T' are placed into the second position of the switching assembly 31 for connection to the 10 MPY meter prover. At this time, the amplifier 75 produces output current for balancing the bridge relative to circuit common CM with the input signals from the meter prover in null operation. The switches 76 and 88 are moved to the left-hand position for measurement operation. The output 69 of the amplifier 66 supplies a current signal through the terminal A to the prover. The current signal from the amplifier 66 produces, in the readout means at the terminal T', a current signal representative of a corrosion rate of 10 MPY. At this time, the resistance 112 is adjusted so that the recorder 103, or other readout means, is calibrated to a scale reading of 10 MPY. The circuitry now is calibrated for measurement of corrosion occurring on the test electrode 21 on the probe 11.

The switching assembly 31 is adjusted into the first position to place the terminals R, T, A and T' in connection with the probe 11. The switches 76 and 88 are returned to the right-hand position for null operation. The potential difference between the test and reference electrodes appears as the freely corroding potential at terminals R and T. This potential signal is applied through the voltage loop circuit to the inputs of the amplifier 66. The amplifier 66 provides a voltage signal in output 69 which passes through the signal generating resistor 77 and appears as a current signal at input 79 of amplifier 75. As a result, a correction signal is stored in capacitor 78 representative of the freely corroding potential. The correction signal in the amplifier 75 produces a zero potential differential between the inputs 79 and 81. Thus, the input 79 is reduced in potential to the circuit common CM of the circuitry by the action of the amplifier 75. Specifically, the correction signal applied to the amplifier 75 in the fourth arm of the bridge provides a discrete current flow through the resistors 37 and 74. This discrete current flow shifts the potential of the positive input 68 relative to the negative input 67 of the amplifier 66. As a result, the correction signal brings the inputs 67 and 68 of the amplifier 66 to a zero potential difference. When the freely corroding potential of the reference and test electrodes is removed from the inputs of the amplifier 66, the current in the output 69 decreases to substantially zero magnitude. However, the amplifier 75 continues to maintain the correction signal stored in the capacitor 78 during the subsequent periods of null and measurement operations of the circuitry. The amplifier 75 serves both to integrate and maintain storage of the correction signal in the capacitor 78. Any current flow out of the capacitor 78 is immediately replaced by an exact equal current flow from the amplifier 75. The control signal, in the capacitor 78, remains at the predetermined ratio to the freely corroding potential between the test and reference electrodes. As a result, the output signal from the amplifier 66 has been automatically corrected for the freely corroding potential at the reference and test electrodes by the function of the amplifier 75.

The switches 76 and 88 are moved to the left-hand position for measurement operation. The output 69 of the amplifier 66 is now connected into the current loop circuit at terminal 96. Simultaneously, a reference signal $\pm V_r$ provides a reference current signal in resistors 36, 71, 89, 72 and 91 to change the potential at the input 67. Now, the output current from the amplifier 66 is controlled to produce the certain polarization potential to be created between the test and reference electrode. For example, the certain polarization potential can be 10 mv. between the reference and test electrodes. The reference current signal is applied through the resistors to cause a potential change representative of 10 mv. at the negative input 67 of the output amplifier 66. As a result, current flow produced by the amplifier 66 in the current loop circuit between the test and auxiliary electrodes causes a 10 mv. polarization potential to be established between the reference and test electrodes. This 10 mv. polarization potential in the voltage loop circuit appears at the input 68 of the amplifier 66. The ultimate current flow for this result in the current loop rebalances the bridge relative to the circuit common CM connection. More particularly, amplifier 66 can provide only that amount of current flow which is required to make equal the potentials at the inputs 67 and 68. At this time, this current flow reaches a steady state value to maintain the certain polarization potential between the reference and test electrodes. It is to be noted that the corrective signal from the capacitor 78 acts in the bridge to remove any potential components representative of the freely corroding potential from the inputs of amplifier 66.

The reference signal $\pm V_r$ to create the reference current signal may be obtained from any suitable source. For example, the reference signal $\pm V_r$ may be taken from a resistor network connected to the D.C. supply source 41. The positive or negative polarity of the reference voltage $V_r$ determines the directional change in current flow produced by the amplifier 66. Thus, the polarity of the reference signal $V_r$ determines whether the polarization established by current flow between the reference and test electrodes is considered anodic or cathodic for purposes of the corrosion measurement.

During the measurement operation of the circuitry, the resistor 91 is placed in series in the arm of the bridge containing the resistance 71. This resistance change is used to compensate for any slight change in impedance in the amplifier 75 when the resistor 77 is disconnected from the output 69 by movement of the switch 76 to the left-hand position. Thus, the four arm bridge of the present circuitry is maintained in exact impedance balance during movements of the switches 76 and 88. As a result, the amplifier 75 maintains the precise balance of the arms of the bridge during both null and measurement operations of the circuitry.

It will be apparent that the described circuitry provides a four arm balanced impedance bridge in the present embodiment of corrosion ratemeter. More particularly, this bridge is balanced automatically relative to circuit common CM of the D.C. power source 41 in both null and measurement operations. The circuitry is not effected by any extraneous electrical signals which are applied to the terminals R, T, A and T' and responds only to the freely corroding potential, and the reduced certain polarization potential, which potentials are present between the reference and test electrodes. Thus, extraneous noises cannot influence the ultimate corrosion rate measurement provided by the circuitry. In addition, the extremely high impedance of the voltage loop circuit, including amplifiers 38 and 39, in the operation of the circuitry prevents any loading effects upon the reference and test electrodes which would reduce the accuracy of corrosion measurement being made. The maintenance of the balanced bridge condition ensures that the present circuitry has a high common mode rejection characteristic against extraneous electrical noises. Therefore, the present corrosion ratemeter can be employed with great utility in refinery and chemical plant installations where high-current electrical circuits generate high levels of extraneous electrical noise.

Various changes and alterations will be apparent to those skilled in the art of the circuitry of the corrosion ratemeter of the present invention. It is intended that such changes and alterations, which do not depart from the spirit of the present invention, be included within the scope of the appended claims. The appended claims define the present invention; the foregoing description is employed for setting forth the present invention embodiments as illustrative in nature.

What is claimed is:

1. A meter for determining the rate of corrosion by means of polarization measurements in a corrodant which comprises:
    (a) a plurality of electrodes adapted to be placed into contact with a corrodant, said electrodes being a reference electrode, a test specimen electrode and a third electrode;
    (b) a voltage loop circuit connecting said reference and test specimen electrodes and a current loop circuit connecting said test specimen and third electrodes;
    (c) a source of direct current including a differential input amplifier connected to a direct current supply means and having first and second inputs connected across opposite corners of a four arm impedance balanced electrical bridge, an output circuit of said differential input amplifier connected in "null" operation to a signal correction means and in "measurement" operation in the current loop circuit to said test specimen and third electrodes,
        said bridge having first and second arms in said voltage loop circuit and connected at their junction to circuit common of said direct current supply means, and third and fourth arms at their junction connected to circuit common of said direct current supply means, and said inputs of said differential input amplifier being connected to the junctions between the first and second arm and said third and fourth arms of said bridge;
    (d) said signal correction means in "null" operation integrating and storing a corrective signal having a predetermined ratio to the freely corroding potential of said reference and test specimen electrodes, and said corrective signal applied to the voltage loop circuit in "measurement" operation to remove from said inputs of said differential amplifier a signal component representing the freely corroding potential between said reference and test specimen electrodes;
    (e) source means applying a reference current signal to one arm of said bridge to produce a component in the output circuit of said differential amplifier during "measurement" operation representative of a certain polarization potential between said reference and test specimen electrodes, said reference current signal producing in said current loop circuit in "measurement" operation an output current to said test specimen and third electrodes to create the certain polarization potential between said reference and test specimen electrodes; and
    (f) readout means to measure the output current in said current loop circuit which creates the certain polarization potential between said reference and test specimen electrodes.

2. The meter of claim 1 wherein said signal correction means comprises a signal correction amplifier having an output circuit connected to one arm of said bridge and an input circuit receiving from said amplifier means a current signal, said output circuit of said signal correction amplifier including a feedback circuit containing a capacitance means for storing said correction signal having a predetermined ratio to said freely corroding potential applied to said amplifier means whereby said signal correction amplifier with its input circuit removed from said output circuit of said amplifier means provides for a substantial period the correction signal to said bridge to remove from said input circuit of said amplifier means an input signal component representing the freely corroding potential between said reference and test specimen electrodes while said amplifier means provides current in said current loop circuit to create the certain polarization potential between said reference and test specimen electrodes.

3. The meter of claim 2 wherein said signal correction amplifier also provides said balancing means by having dual inputs in said input circuit selectively connected to the output circuit of said amplifier means in "null" operation, said capacitance means in a feedback circuit connecting one input of said signal correction amplifier to its output circuit, and said other input of said signal correction amplifier being connected to a pair of bridge arms, and said signal correction amplifier providing a low impedance connection between said pair of arms in said bridge whereby said bridge is balanced when said correction and reference signals are applied to said bridge.

4. The meter of claim 1 wherein said first and second arms of said bridge in the voltage loop circuit include high impedance voltage follower amplifiers.

5. The meter of claim 1 wherein said signal correction means provide the correction signal in one arm of said voltage loop circuit to produce a zero input voltage between the inputs of said differential amplifier so that its output current is free of any component representing the freely corroding potential during "measurement" operation.

6. The meter of claim 1 wherein said signal correction means includes a signal correction amplifier having an output circuit connected to one of said arms in the voltage loop circuit and an input circuit selectively connected to the output circuit of said differential amplifier in "null" operation, a feedback circuit between said input and output circuits of said signal correction amplifier including capacitance means for storing said correction signal having a predetermined ratio to said freely corroding potential applied to said differential amplifier, and said correction signal in said voltage loop circuit producing a zero input voltage between the inputs of said differential amplifier so that its output current is free of any component representing the freely corroding potential during "measurement" operation.

7. The meter of claim 1 wherein said first and second arms of said bridge in the voltage loop circuit include high impedance voltage follower amplifiers having inputs connected to said reference and test specimen electrodes, and said inputs of said voltage follower amplifiers providing a balanced connection to circuit common whereby any extraneous electrical signals not associated with the freely corroding potential appear in equal magnitude at the inputs of said voltage follower amplifiers to produce a zero voltage differential at the inputs of said differential voltage amplifier.

8. The meter of claim 1 wherein said signal correction means includes a signal correction amplifier with dual inputs and having an output circuit connected through one of said arms into said bridge and an input circuit selectively connected to the output circuit of said differential amplifier in "null" operation, a capacitance means for storing said correction signal having a predetermined ratio to said freely corroding potential applied to said differential amplifier, said capacitance means connected in a feedback circuit connecting one input of said signal correction amplifier to its output circuit, and another input of said signal correction amplifier being connected to another arm of said bridge, and said signal correction amplifier providing a low impedance connection between said one of said arms of said bridge to circuit common whereby said bridge is balanced by said correction signal in said voltage loop and said output current of said differential amplifier is free of any component representing the freely corroding potential during "measurement" operation.

9. The meter of claim 1 wherein said first and second arms of said bridge in the voltage loop circuit include high impedance voltage follower amplifiers having inputs connected to said reference and test specimen electrodes, and said inputs of said voltage follower amplifiers providing a balanced connection to circuit common whereby said voltage follower amplifiers have a high common mode rejection of extraneous electrical signals not associated with the freely corroding potential and only signal components of said freely corroding potential and certain polarization potential appear at the inputs of said differential amplifier, and said signal correction amplifier carrying dual inputs and having an output circuit connected through one of said third and fourth arms of said bridge and an input circuit selectively connected to the output circuit of said differential amplifier in "null" operation, a capacitance means for storing said correction signal having a predetermined ratio to said freely corroding potential applied to said differential amplifier, said capacitance means connecting a first input of said signal correction amplifier to its output circuit, and the second input of said signal correction amplifier being connected to the other of said third and fourth arms of said bridge, and said signal correction amplifier providing a low impedance connection between said arm connected to the first input thereof and circuit common whereby said bridge is balanced by said correction signal in said voltage loop and said output current of said differential amplifier is free of any component representing the freely corroding potential during "measurement" operation, and said reference current signal is applied to the arm of said bridge connected to said second input of said signal correction amplifier.

10. A meter for determining the rate of corrosion by means of polarization measurements in a corrodant which comprises:
 (a) a plurality of electrodes adapted to be placed into contact with a corrodant, said electrodes being a reference electrode, a test specimen electrode and a third electrode;
 (b) a voltage loop circuit connecting said reference and test specimen electrodes and a current loop circuit connecting said test specimen and third electrodes;
 (c) a four arm impedance balanced electrical bridge connected at the junctions of first and second arms in the voltage loop circuit, and third and fourth arms, to circuit common of a direct current supply means, and a source of direct current including amplifier means connected to said direct current supply means and in a current loop circuit to said test specimen and reference electrodes;
 (d) said amplifier means having an input circuit connected between the junctions of said first and third arms, and second and fourth arms, of said bridge, and said amplifier having an output circuit connected in the current loop circuit to said test specimen and third electrodes;
 (e) signal correction means applying a correction signal to said bridge for removing from said input circuit of said amplifier means an input signal component representing the freely corroding potential between said reference and test specimen electrodes;
 (f) source means applying a reference signal current to said bridge for providing an output current from said amplifier means in said current loop circuit to said test specimen and third electrodes to create a certain polarization potential between said reference and test specimen electrodes;

(g) balancing means in said bridge for impedance adjustment in one arm thereof to maintain said first and second arms, and said third and fourth arms, with substantially identical electrical characteristics when said signal correction means removes the freely corroding potential from said input circuit of said amplifier means, and when said source means applies the reference signal to said bridge to provide output current in said current loop circuit from said amplifier means to create said certain polarization potential between said reference and test specimen electrodes; and (h) readout means to measure the output current in said current loop circuit which creates the certain polarization potential between said reference and test specimen electrodes.

References Cited

UNITED STATES PATENTS

| | | | |
|---|---|---|---|
| 3,616,417 | 10/1971 | Wilson | 204—195 C |
| 3,661,750 | 5/1972 | Wilson | 204—195 C |
| 3,661,751 | 5/1972 | Wilson | 204—195 C |

GERALD L. KAPLAN, Primary Examiner

U.S. Cl. X.R.

324—71 R